UNITED STATES PATENT OFFICE 2,003,530

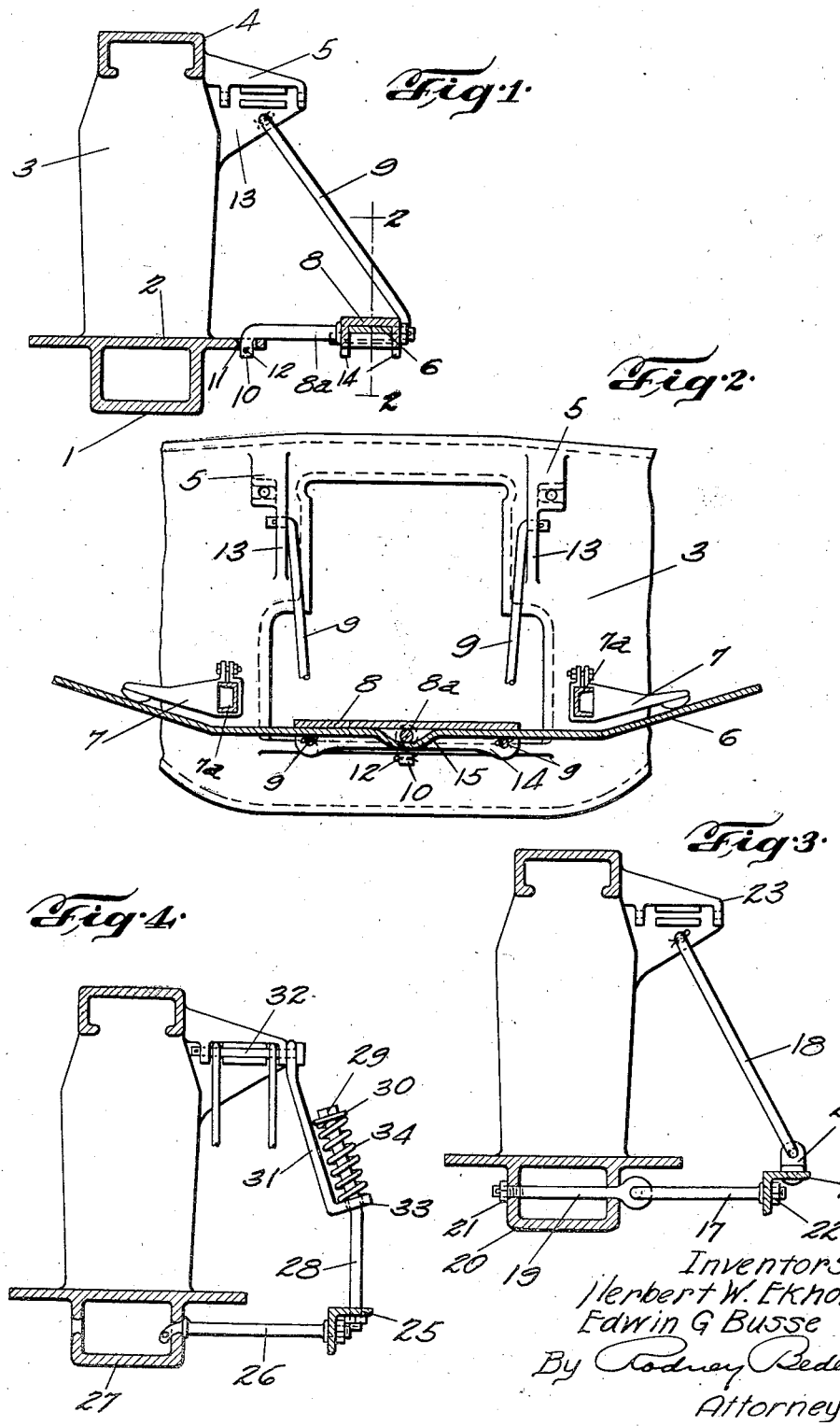

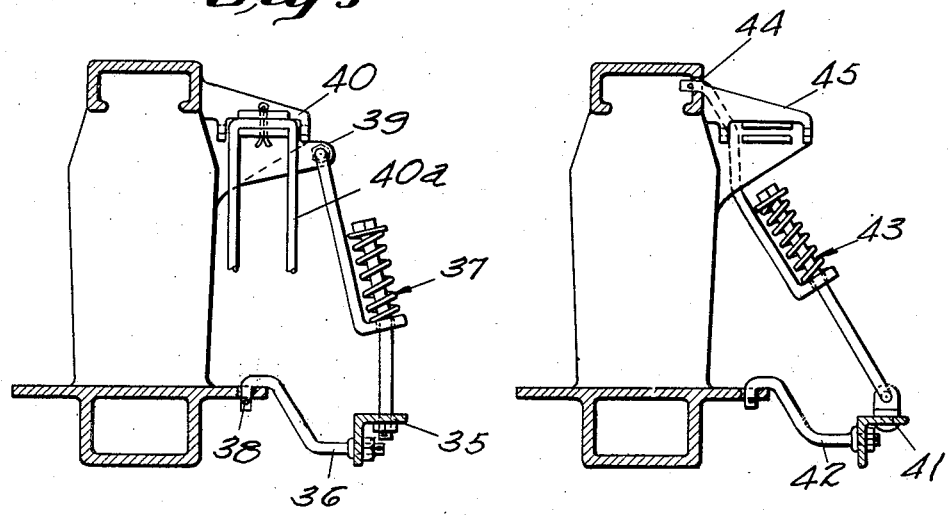
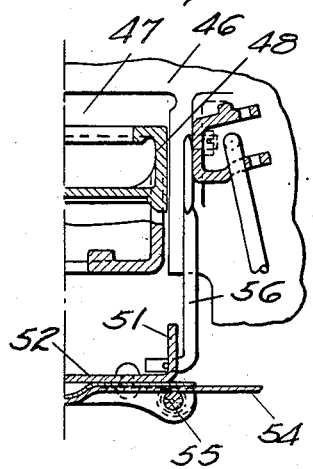
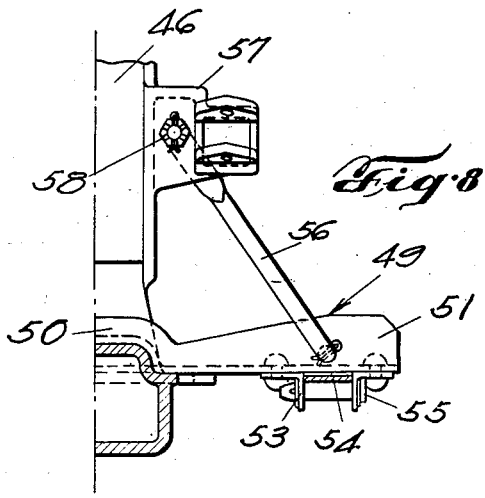

BRAKE BEAM SUPPORT

Herbert W. Ekholm and Edwin G. Busse, Chicago, Ill., assignors to Chicago Railway Equipment Company, Chicago, Ill., a corporation of Illinois Application July 18, 1932, Serial No. 623,147

21 Claims. (Cl. 188—213)

This invention relates to brake beam supports or safeguarding devices for railway vehicles and consists particularly in novel means for attaching a fourth point support or guard to the truck side frame.

In trucks having no spring plank, the brake beam fourth point support or safety guard has, in some cases, been mounted on the truck frame by means of a single arm or ledge integral with or secured to the truck side frame. With this arrangement the weight of the support or guard imparts bending forces to the arm and its restricted connections with the frame and these parts are susceptible to being weakened and broken due to vibration and contact with obstacles between the tracks. Also, the provision of the special arm or ledge increases the cost of the truck frame.

One object of the present invention is to provide stable means for mounting the brake beam fourth point support, guide, or safety guard which requires minimum variation of, or addition to, the truck frame.

Another object is to decrease the cost of the truck by attaching the brake beam safety guard or support to a frame member by means of relatively light and inexpensive parts.

Another object is to distribute the weight of the guard or support device between substantially spaced points on the frame.

These objects and others are attained by the structures illustrated in the accompanying drawings in which—

Figures 1, 3, 4, 5, 6, and 8 are vertical transverse sections through a part of a railway truck side frame with various forms of the invention applied thereto.

Figure 2 is a vertical longitudinal section taken on the line 2—2 of Figure 1.

Figure 7 is a similar sectional view of the structure in Figure 8.

In Figure 1, the invention is illustrated as applied to a truck side frame including a hollow lower portion 1, a bolster spring seat 2, struts or columns 3 and an upper element 4 forming an opening for the bolster and bolster springs (not shown). The usual brake hanger brackets 5 project inwardly from the side frame.

Located inwardly from the side frame is a longitudinally disposed strap 6 which engages chairs 7 on the brake beams 7a and serves as a support, guide, and guard for the beams. Strap 6 is mounted on a bracket 8, which in turn is carried from the side frame by means of a horizontal bar 8a and diagonal braces 9. Bar 8a has a hooked end 10 secured within a perforation 11 in the inner extremity of the spring seat 2 by means of a pin or key 12. Each brace 9 has a hooked upper end pivoted to rib 13 on a corresponding hanger bracket 5. At its inner end bar 8a extends through flanges 14 depending from bracket 8 and engages a depression 15 in the strap 6, thus preventing longitudinal movement of the strap relative to bracket 8. Braces 9 at their lower extremities similarly extend through the flanges 14, having pivotal connection therewith, and support the strap 6 at the ends of the bracket 8. The strap 6 is preferably made of resilient material to provide yielding support for the beam and is distorted during assembly with the bracket 8 to prevent rattling. Elements 8a, 9 and 3 constitute the sides of a triangular supporting truss for the bracket 8.

In Figure 3, a rigid angle safety guard 16 is carried by the truck side frame by means of a horizontal bar 17 and a diagonal brace 18. The outer end of bar 17 is pivoted to an eye bolt 19 which extends through the lower portion 20 of the side frame and is held by a nut 21, and the inner end of bar 17 is secured by a nut 22 to the vertical flange of member 16. Brace 18 is pivoted at the upper extremity to the hanger bracket 23 and at the lower end to a lug 24 which is secured to the horizontal flange of member 16.

In Figure 4, the brake beam safety guard 25 is carried by a rigid horizontal compression bar 26, which is hooked into a perforation in the wall of the lower portion 27 of the side frame, and a yielding brace. The brace includes a bar or rod 28 projecting upwardly from member 25 and at the top has a head 29 and mounts a spring seat disc 30. A member 31 has a loop at the top end carried by the hanger pin 32 and another loop 33 at the bottom which encircles bolt 28. A coiled spring 34 is compressed between disc 30 and loop 33 and yieldingly resists elongation of the brace.

In Figure 5, the safety guard 35 is provided with a yielding support including a laterally and upwardly extending bent bar 36 secured to the vertical flange of the guard and a yielding brace, as in Figure 4, and indicated generally at 37. Bar 36 at the outer extremity bends upwardly over the inner end of the bolster spring seat and is secured within a perforation therein by a key 38. The yielding brace 37 is pivoted to a lug 39 projecting from the hanger bracket 40 outwardly of hanger 40a.

In Figure 6, the safety guard 41 is supported by means of a bent bar 42 similar to bar 36 in the previous form and a diagonal yielding brace indicated generally at 43. The brace 43 at the upper extremity extends into a perforation 44 in the upper part of the side frame adjacent the hanger bracket 45 and is secured therein by a suitable pin or key.

Figures 7 and 8 illustrate the invention applied to a truck side frame 46 constructed to accommodate a spring plank. The side frame has a central opening 47 for receiving the end of bolster 48 which is yieldingly supported on the usual springs (not shown). Resting on the side frame at the bottom of the bolster opening 47, is a member 49 corresponding to the end part of the usual spring plank. Member 49 has an outer portion 50 for mounting the bolster spring, and resting on the side frame, an inner part including vertical flanges 51, and a horizontal web 52. A bracket 53 riveted to the under surface of web 52 carries brake beam guard, guide or support device 54 by means of pins 55. Member 49 is braced by diagonal bars 56, each of which is pivoted to one of the vertical flanges 51 and at the upper end has a horizontally disposed threaded portion pivotally secured to a brake hanger bracket 57 by means of a nut 58.

It will be observed that in each of the forms the truck side frame need be provided only with suitable perforations to facilitate mounting the brake beam guard or support device. The means for attaching the device to the truck frame comprise substantially a triangular truss in which the horizontal member receives compression only and the diagonal brace receives tension. Accordingly, these members may be of lighter construction than is the case where an attaching element is subject to bending due to the weight of the safety guard. Also the weight of the guard, guide or support device is distributed between spaced parts of the frame in a manner to minimize the strain applied to the affected parts.

In Figures 1, 3, and 7, the attaching structure will be rigid even though the horizontal and diagonal parts are pivoted to the side frame and in these forms resiliency, if desired, must be derived from the support or safety device itself. In the remaining figures the attaching means includes a resilient brace permitting the use of a rigid support extending beneath the brake beams. In these forms the various elements of the supporting truss will be subject to relative movement with respect to each other, the frame and brake beam support device underlying the beams, and pivotal connections should be used between all parts.

The invention is not necessarily limited to the application of the described support to a truck side frame but includes broadly the application of the various forms to any convenient truck part. Moreover, various other modifications as to details may be made without departing from the spirit of the invention and exclusive use of all such modifications as come within the scope of the appended claims is contemplated.

What is claimed is:

1. In combination, a railway truck frame member, a brake beam guard, guide or support device spaced therefrom, and a plurality of support elements pivoted to said device and engaging said frame member at vertically spaced points.

2. In combination, a railway truck frame member, a brake beam guard, guide or support device spaced therefrom, and a yielding support for said device comprising a plurality of separate elements projecting from said device at an angle to each other and mounted on said frame member at vertically spaced points.

3. In combination, a railway truck side frame member, a brake beam guard, guide or support device disposed inwardly thereof, and a triangular support for said device comprising a portion of said frame member and elements secured to said device and engaging said portion at vertically spaced points.

4. In combination, a railway truck side frame member, a brake beam guard, guide or support device disposed inwardly thereof, and a support for said device comprising a tension part depending from said frame and a compression part projecting from said member at a point below said tension part.

5. In combination, a railway truck side frame part, a brake beam guard, guide or support device disposed inwardly thereof, and a support for said device comprising a member extending upwardly and outwardly from said device and pivoted on the upper portion of said frame part and an element projecting substantially horizontally from said device and pivoted on said part below said member.

6. In combination, a railway truck side frame including a brake hanger bracket and a part below the same, a brake beam guard, guide or support device located inwardly of said side frame, and support means for said device comprising separate elements projecting from said device and attached to said bracket and said part, respectively.

7. In combination, a railway truck side frame including a brake hanger bracket and a bolster spring seat spaced vertically therefrom, a brake beam guard, guide or support device located inwardly of said side frame, and support means for said device comprising elements projecting from said device at an angle to each other and respectively pivoted on said bracket and said spring seat.

8. In a railway truck, a side frame including a bolster opening, a member projecting from the lower part of said opening, a brake beam guard, guide or support device carried by said member, and a brace projecting upwardly and outwardly from said device and engaging said side frame adjacent the upper part of said opening.

9. In a railway truck, a side frame including a bolster opening, a separate member having a bolster spring seat part resting in the lower part of said opening and a portion projecting inwardly therefrom, a brake beam guard, guide or support device carried by said portion, and a brace projecting upwardly and outwardly from said device and engaging said side frame above said opening.

10. In combination, a railway truck side frame member, a brake beam guard, guide or support device located inwardly therefrom, and rigid truss support means for said device including rigid elements projecting at an angle therefrom and pivoted to vertically spaced points on said member.

11. In combination, a railway truck side frame member, a brake beam guard, guide or support device located inwardly therefrom, and support means for said device comprising a part projecting sidewardly therefrom and pivoted on said frame member, and a yielding element projecting upwardly and outwardly from said device and secured to said member at a point above said part.

12. In combination, a railway truck side frame including a brake hanger bracket, a brake beam guard, guide or support device located inwardly of said frame, and support means for said device comprising a yielding element depending from said bracket and pivoted on said device, and a rigid element pivoted to a point on said frame below said bracket and engaging said device at an angle to said yielding element.

13. In combination, a railway truck side frame member, a brake beam guard, guide or support device located inwardly therefrom, a rigid element projecting substantially horizontally therefrom and pivoted on the lower part of said frame member, and a brace for said device comprising a rod projecting upwardly from said device and having an enlargement, an element depending from the upper part of said frame member and having a portion at the bottom surrounding said rod below said enlargement, and a spring between said enlargement and said portion and yieldingly resisting expansion of said brace.

14. In combination, a railway truck side frame including a brake hanger bracket, a hanger pin in said bracket, a brake beam guard, guide or support device located inwardly of said side frame, and means for attaching said device to said side frame comprising an element projecting sidewardly from said device and engaging said frame and an element projecting upwardly therefrom and carried by said hanger pin.

15. Means for attaching a brake beam guard, guide or support device to a truck part and comprising a bracket for mounting the device, a member projecting sidewardly from said bracket for attachment to said part, and a brace projecting upwardly from said bracket at an angle to said member for attachment to said truck part above said member.

16. In combination, a brake beam guard, guide or support device having a central depression, and means for attaching said device to a truck part and comprising a bracket having flanges at the sides of said device, a bar projecting sidewardly from said bracket and engaging said depression, and braces projecting upwardly from said bracket and having portions extending between said flanges and supporting said device, said bar and braces being adapted to be attached to the truck part at vertically spaced points, and said bar cooperating with said depression to prevent longitudinal movement of said device in said bracket.

17. In combination, a railway truck side frame, a brake beam guard, guide or support member spaced therefrom and suspended from the upper portion of said side frame and braced from the lower portion thereof.

18. In combination, a railway truck frame having a brake hanger bracket thereon and a brake beam yielding guard, guide or support member suspended from said bracket and said frame at a point spaced from said bracket.

19. A railway brake beam guard, guide or support device comprising an element for engaging the brake beam, and elements extending laterally and diagonally upwardly therefrom respectively for attachment to a truck side frame.

20. A railway brake beam guard, guide or support device comprising an element for engaging the brake beam, and elements extending, respectively, laterally and diagonally upwardly therefrom for attachment to a truck side frame, at least one of said elements being of resilient structure arranged to yield under stress applied through the brake beam with which the device is associated.

21. In combination, a railway truck side frame part, a brake beam guard, guide or support device located inwardly thereof, and support means for said device comprising elements projecting, respectively, laterally and diagonally upwardly therefrom and engaging vertically spaced points on said frame part, at least one of said elements being yieldingly attached to said part.

HERBERT W. EKHOLM.
EDWIN G. BUSSE.